United States Patent [19]

Tsutsui

[11] Patent Number: 5,781,586
[45] Date of Patent: Jul. 14, 1998

[54] METHOD AND APPARATUS FOR ENCODING THE INFORMATION, METHOD AND APPARATUS FOR DECODING THE INFORMATION AND INFORMATION RECORDING MEDIUM

[75] Inventor: Kyoya Tsutsui, Kanagawa, Japan

[73] Assignee: Sony Corporation, Tokyo, Japan

[21] Appl. No.: 506,729

[22] Filed: Jul. 26, 1995

[30] Foreign Application Priority Data

Jul. 28, 1994 [JP] Japan ................... 6-177056

[51] Int. Cl.$^6$ ..................................... H04B 1/66
[52] U.S. Cl. ............... 375/241; 375/242; 375/253; 704/229; 704/501; 704/504; 341/51
[58] Field of Search ..................... 375/240–242, 375/245, 246, 253; 382/251, 248; 395/2.1, 2.38, 2.39, 2.91, 2.92, 2.94, 2.95; 341/87, 51; 348/384, 390, 403, 405; 704/229, 230, 500, 501, 503, 504

[56] References Cited

U.S. PATENT DOCUMENTS

| | | | |
|---|---|---|---|
| 3,349,183 | 10/1967 | Campanella . | |
| 4,184,049 | 1/1980 | Crochiere et al. | 179/1 SA |
| 4,516,241 | 5/1985 | Farah et al. | 370/110.1 |
| 4,535,472 | 8/1985 | Tomcik | 381/31 |
| 4,569,058 | 2/1986 | Grallert | 375/27 |
| 4,573,187 | 2/1986 | Bui et al. | 381/43 |
| 4,622,598 | 11/1986 | Doi et al. | 360/22 |
| 4,625,286 | 11/1986 | Papamichalis et al. | 364/513.5 |
| 4,697,212 | 9/1987 | Osawa et al. | 360/48 |
| 4,706,265 | 11/1987 | Furukawa | 375/122 |
| 4,713,776 | 12/1987 | Araseki | 364/513.5 |

(List continued on next page.)

FOREIGN PATENT DOCUMENTS

| | | | |
|---|---|---|---|
| 0 370 277 A3 | 5/1990 | European Pat. Off. | H04B 1/66 |
| 0 349 325 A2 | 4/1991 | European Pat. Off. | G11B 20/10 |
| 0 423 050 A1 | 4/1991 | European Pat. Off. | H04B 1/66 |
| 0 428 156 A2 | 5/1991 | European Pat. Off. | H03M 7/30 |
| 0 446 031 A3 | 9/1991 | European Pat. Off. | H04B 1/66 |
| 0 458 645 A2 | 11/1991 | European Pat. Off. | H04B 1/66 |
| 0 463 473 A2 | 1/1992 | European Pat. Off. | G06F 15/332 |
| 0 466 190 A2 | 1/1992 | European Pat. Off. | G11B 20/10 |

(List continued on next page.)

OTHER PUBLICATIONS

"Adaptive Transform Coding With an Adaptive Block Size (ATC–ABS)"–Sugiyama et al., ICASSP 90 vol. 2, Apr. 3–6, 1990 IEEE –pp. 1093–1096.

An application–specific FFT processor Electronic Engineering, Jun. 1988 pps 100 and 104–106.

Application of Quadrature Mirror Filters To Split Band Voice Coding Schemes, Esteban et al., 1977 IEEE International Conference on Acoustics, Speech & Signal Processing, pp. 191–195.

Polyphase Quadrature Filters —A New Subband Coding Technique, Rothweiler ICASSP 1983, Boston, vol. 3, pp. 1280–1283.

The Critical Band Coder–Digital Encoding of Speech Signals Based on the Perceptual Requirements of the Auditory System, Krasner, 1080 IEEE, vol. 1–3, pp. 327–331.

(List continued on next page.)

*Primary Examiner*—Stephen Chin
*Assistant Examiner*—Amanda T. Le
*Attorney, Agent, or Firm*—Limbach & Limbach LL

[57] ABSTRACT

A method and apparatus for encoding an input signal in which the input signal is transformed into frequency components which are encoded by quantization from one encoding unit to another. The information specifying zero encoding units among the encoding units in which encoding is done on the assumption that all frequency components contained in them are deemed to be zero are encoded, is encoded, while the quantization step information of the zero encoding units is outputted without encoding. With the encoding method and apparatus, the number of the encoding bits may be decreased while deterioration in the input signal is prohibited for improving the encoding efficiency.

18 Claims, 10 Drawing Sheets

U.S. PATENT DOCUMENTS

| | | | |
|---|---|---|---|
| 4,748,579 | 5/1988 | Zibman et al. | 364/736 |
| 4,873,589 | 10/1989 | Inazawa et al. | 360/53 |
| 4,882,754 | 11/1989 | Weaver et al. | 381/35 |
| 4,885,790 | 12/1989 | McAulay | 381/36 |
| 4,903,301 | 2/1990 | Kondo et al. | 381/30 |
| 4,912,763 | 3/1990 | Galand et al. | 381/31 |
| 4,932,062 | 6/1990 | Hamilton | 381/43 |
| 4,949,383 | 8/1990 | Koh et al. | 381/31 |
| 4,964,166 | 10/1990 | Wilson | 381/34 |
| 5,016,107 | 5/1991 | Sasson et al. | 358/209 |
| 5,040,217 | 8/1991 | Brandenburg et al. | 381/47 |
| 5,109,417 | 4/1992 | Fielder et al. | 381/36 |
| 5,115,240 | 5/1992 | Fujiwara et al. | 341/51 |
| 5,120,387 | 6/1992 | Yoshikawa | 375/122 |
| 5,128,963 | 7/1992 | Akagiri | 375/25 |
| 5,142,656 | 8/1992 | Fielder et al. | 381/37 |
| 5,159,611 | 10/1992 | Tomita et al. | 375/34 |
| 5,185,800 | 2/1993 | Mahieux | 381/29 |
| 5,204,677 | 4/1993 | Akagiri et al. | 341/118 |
| 5,218,561 | 6/1993 | Iwadare | 364/725 |
| 5,222,189 | 6/1993 | Fielder | 395/2 |
| 5,235,671 | 8/1993 | Mazor | 395/2 |
| 5,241,603 | 8/1993 | Akagiri et al. | 381/37 |
| 5,243,588 | 9/1993 | Maeda et al. | 369/54 |
| 5,264,846 | 11/1993 | Oikawa | 341/76 |
| 5,268,685 | 12/1993 | Fujiwara | 341/76 |
| 5,285,476 | 2/1994 | Akagiri et al. | 375/25 |
| 5,294,925 | 3/1994 | Akagiri | 341/50 |
| 5,301,205 | 4/1994 | Tsutsui et al. | 375/1 |
| 5,311,561 | 5/1994 | Akagiri | 375/122 |
| 5,375,189 | 12/1994 | Tsutsui | 395/2.38 |
| 5,381,143 | 1/1995 | Shimoyoshi et al. | 341/51 |
| 5,388,093 | 2/1995 | Yoshida et al. | 369/124 |
| 5,388,209 | 2/1995 | Akagiri | 395/2.38 |
| 5,406,428 | 4/1995 | Suzuki | 360/53 |
| 5,454,011 | 9/1995 | Shimoyoshi | 375/240 |
| 5,461,378 | 10/1995 | Shimoyoshi et al. | 341/51 |
| 5,471,558 | 11/1995 | Tsutsui | 395/2.28 |

OTHER PUBLICATIONS

| | | | |
|---|---|---|---|
| 0 473 367 A1 | 3/1992 | European Pat. Off. | H03M 7/30 |
| 0 506 394 A2 | 9/1992 | European Pat. Off. | G10L 7/00 |
| 0 525 089 A2 | 2/1993 | European Pat. Off. | H04B 1/66 |
| A 01 069 181 | 3/1989 | Japan | H04N 7/137 |
| 6-29934 | 2/1994 | Japan | H04B 14/06 |
| 6-149292 | 5/1994 | Japan | H03M 7/30 |
| WO 90/09064 | 8/1990 | WIPO | H04B 1/66 |
| WO 91/16769 | 10/1991 | WIPO | H04B 1/66 |
| WO 92/17884 | 10/1992 | WIPO | G11B 20/10 |

OTHER PUBLICATIONS

An Application Specific DSP Chip for 100 MHZ Data Rates, Magar et al., IEEE 1988 —pps 1989–1992.

Perceptual Transform Coding of Wideband Stereo Signals, James D. Johnston,ICASSP '89, vol. 3, pp. 1993–1996.

Signal Compression: Technology Targets and Research Directions, Nikil Jayant, IEEE vol. 10, No. 5, pp. 796–818.

METHOD AND APPARATUS FOR ENCODING THE INFORMATION, METHOD AND APPARATUS FOR DECODING THE INFORMATION AND INFORMATION RECORDING MEDIUM

BACKGROUND OF THE INVENTION

This invention relates to a method and an apparatus for encoding input signals, such as digital data, by so-called high-efficiency encoding, an information recording medium on which the high-efficiency encoded information is recorded, and a method and apparatus for decoding and reproducing the encoded information reproduced from the information recording medium or transmitted over a transmission route.

There exist a variety of high efficiency encoding techniques of encoding audio or speech signals. Examples of these techniques include transform coding in which a frame of digital signals representing the audio signal on the time axis is converted by an orthogonal transform into frequency-domain signals which are divided into plural frequency bands and encoding is performed on the band basis, and a sub-band coding in which the frequency band of the audio signal is divided by a filter bank into a plurality of sub-bands without forming the signal into frames along the time axis prior to coding. There is also known a combination of sub-band coding and transform coding, in which digital signals representing the audio signal are divided into a plurality of frequency ranges by sub-band coding, and transform coding is applied to each of the frequency ranges.

Among the filters for dividing a frequency spectrum into a plurality of equal-width frequency ranges include the quadrature mirror filter (QMF) as discussed in R. E. Crochiere, Digital Coding of Speech in Sub-bands, 55 Bell Syst. Tech J. No.8 (1976). With such QMF filter, the frequency spectrum of the signal is divided into two equal-width bands. With the QMF, aliasing is not produced when the frequency bands resulting from the division are subsequently combined together.

In "polyphase Quadrature Filters—A New Subband Coding Technique", Joseph H. Rothweiler ICASSP 83, Boston, there is shown a technique of dividing the frequency spectrum of the signal into equal-width frequency bands. With the present polyphase QMF, the frequency spectrum of the signals can be divided at a time into plural equal-width frequency bands.

There is also known a technique of orthogonal transform including dividing the digital input audio signal into frames of a predetermined time duration, and processing the resulting frames using a discrete Fourier transform (DFT), discrete cosine transform (DCT) and modified DCT (MDCT) for converting the signal from the time axis to the frequency axis. Discussions on MDCT may be found in J. P. Princen and A. B. Bradley, "Subband Transform Coding Using Filter Bank Based on Time Domain Aliasing Cancellation", ICASSP 1987.

By quantizing the signals divided on the band basis by the filter or orthogonal transform, it becomes possible to control the band subjected to quantization noise and psychoacoustically more efficient coding may be realized by utilizing the so-called masking effects. If the signal components are normalized from band to band with the maximum value of the absolute values of the signal components, it becomes possible to effect more efficient coding.

In a technique of quantizing the spectral coefficients resulting from an orthogonal transform, it is known to use sub bands that take advantage of the psychoacoustic characteristics of the human auditory system. That is, spectral coefficients representing an audio signal on the frequency axis may be divided into a plurality of critical frequency bands. The width of the critical bands increase with increasing frequency. Normally, about 25 critical bands are used to cover the audio frequency spectrum of 0 Hz to 20 kHz. In such a quantizing system, bits are adaptively allocated among the various critical bands. For example, when applying adaptive bit allocation to the spectral coefficient data resulting from MDCT, the spectral coefficient data generated by the MDCT within each of the critical bands is quantized using an adaptively allocated number of bits. There are presently known the following two bit allocation techniques.

For example, in IEEE Transactions of Acoustics, Speech and Signal processing, vol. ASSP-25, No.4, August 1977, bit allocation is carried out on the basis of the amplitude of the signal in each critical band. This technique produces a flat quantization noise spectrum and minimizes the noise energy, but the noise level perceived by the listener is not optimum because the technique does not effectively exploit the psychoacoustic masking effect.

In the bit allocation technique described in M. A. Krassner, The Critical Band Encoder—Digital Encoding of the perceptual Requirements of the Auditory System, ICASSP 1980, the psychoacoustic masking mechanism is used to determine a fixed bit allocation that produces the necessary signal-to-noise ratio for each critical band. However, if the signal-to-noise ratio of such a system is measured using a strongly tonal signal, for example, a 1 kHz sine wave, non-optimum results are obtained because of the fixed allocation of bits among the critical bands.

For overcoming these inconveniences, a high efficiency encoding apparatus has been proposed in which the total number of bits available for bit allocation is divided between a fixed bit allocation pattern pre-set for each small block and a blockbased signal magnitude dependent bit allocation, and the division ratio is set in dependence upon a signal which is relevant to the input signal such that the smoother the signal spectrum, the higher becomes the division ratio for the fixed bit allocation pattern.

With this technique, if the energy is concentrated in a particular spectral component, as in the case of a sine wave input, a larger number of bits are allocated to the block containing the spectral component, for significantly improving the signal-to-noise characteristics in their entirety. Since the human auditory system is highly sensitive to a signal having acute spectral components, such technique may be employed for improving the signal-to-noise ratio for improving not only measured values but also the quality of the sound as perceived by the ear.

In addition to the above techniques, a variety of other techniques have been proposed, and the model simulating the human auditory system has been refined, such that, if the encoding device is improved in its ability, encoding may be made with higher efficiency in light of the human auditory system.

If these encoding units are used, the conventional practice has been to group the frequency components by band-based units (encoding units), encode the frequency components using several bits each of the normalization coefficient information and the quantization step information, specifying the number of bits employed for quantization from one encoding unit to another, and to transmit the normalization coefficient information and the quantization step information along with the encoded frequency components.

If, in consideration of, for example, masking effects, the encoding is carried out on the assumption that frequency components in a given encoding unit are all zero, the normalization coefficient information and the normalized and quantized frequency components can be omitted when encoding the frequency components as long as the encoding unit is concerned.

However, with the conventional encoding method, several bits need to be accorded to the respective encoding units for specifying the quantization step information. In particular, if an extremely low bit rate is used for encoding, the number of the encoding units, which are encoded on the assumption that all the frequency components contained therein are all zero, referred to herein as zero encoding units, is inevitably increased. It is not advisable for achieving the encoding with satisfactory encoding efficiency to accord several bits for specifying the quantization step information for these encoding units.

OBJECT AND SUMMARY OF THE INVENTION

It is therefore a principal object of the present invention to provide an information encoding method and apparatus in which encoding is performed so that a zero encoding unit may be specified with a smaller number of bits for achieving high efficiency encoding.

It is another object of the present invention to provide an information decoding method and apparatus for decoding the information encoded in this manner, and an information recording medium having recorded thereon the information encoded in this manner.

In one aspect, the present invention provides an information encoding method including the steps of transforming an input signal into frequency components by transform means, encoding an output of the transform means by quantization from one encoding unit to another and encoding data specifying a zero encoding unit in which all frequency components are deemed to be zero, with the quantization step information for the zero encoding unit not being encoded.

In another aspect, the present invention provides an information encoding apparatus including means for transforming an input signal into frequency components by transform means, means for encoding an output of the transform means by quantization from one encoding unit to another and means for encoding a specifying data for a zero encoding unit in which all frequency components are deemed to be zero, with the quantization step information for the zero encoding unit not being encoded.

The zero encoding unit specifying information may be enumerated by the flag information for the encoding units or the run-length information furnishing the position information of the zero encoding units.

The encoding method may also include the step of determining the encoding unit configuration and encoding the input signal only when a particular encoding unit configuration has been selected. That is, it is now assumed that the encoding unit configuration in which the frequency components may be resolved into respective encoding units by plural different methods, even with the frequency resolution remaining the same, is adaptively determined depending upon e.g., the energy distribution of the frequency components (spectral signals). If, in such case, the frequency components can be resolved into a fewer number of encoding units, the zero encoding unit specifying information is not encoded, whereas, if the frequency components are resolved into a larger number of encoding units, the zero encoding unit specifying information is encoded while the encoding of the quantization step information of the zero encoding unit is omitted. The encoding unit configuration may be selectable on the block or band basis.

The input signal is preferably an acoustic signal.

In still another aspect, the present invention provides an information decoding method for decoding a signal encoded by a pre-set encoding method from one encoding unit to another, including the steps of decoding furnished signal components, inverse orthogonal transforming signal components into time domain signals and decoding the information specifying an encoding unit in which all of frequency components thereof are deemed to be zero. The step of decoding the signal components decodes the signal component based upon an output of the step of decoding the zero encoding unit specifying information.

In still another aspect, the present invention provides a corresponding decoding apparatus.

In yet another aspect, the present invention provides an information recording medium having recorded thereon the information specifying zero encoding units in which all frequency components in an encoding unit as an encoding unit are deemed to be zero, and the signal component information. The zero encoding unit specifying information is arrayed upstream of the signal component information to constitute a data stream.

With the information encoding method and apparatus of the present invention, since the quantization step information for the zero encoding units is not encoded, the volume of the output information may be correspondingly diminished, such that, if there exist a large number of zero encoding units, the quantization information therefor can be omitted thereby improving the encoding efficiency of the waveform signals.

By providing means for determining the encoding unit configuration, and by carrying out encoding using the zero encoding unit information only when a specified unit configuration is selected, the waveform signal can be efficiently encoded in accordance with the energy distribution of spectral signals. If the present encoding method and apparatus are applied to encoding the acoustic signals, the tonal components, which are crucial to the hearing sense, may be encoded with high fidelity without lowering the encoding efficiency in case the signal spectrum has a flatter energy distribution, thus ensuring high efficiency signal compression.

With the information decoding method and apparatus of the present invention, it is judged, depending upon the decoded zero encoding unit specifying information, which of the encoding unit is the zero encoding unit, and the encoded data is decoded in dependence upon the results of judgment. This enables optimum playback signals to be produced with the small amount of the arithmetic-logical operations resulting from the use of a smaller number of bits of the quantization step information. In particular, if the input signal is an acoustic signal, optimum playback signals to the hearing sense may be produced.

In sum, with the information encoding method and apparatus of the present invention, when the input signal is transformed into frequency components (spectral signals) and the transformed output is encoded by quantization from one encoding unit to another, the encoding of the quantization step information is omitted for the zero encoding unit in which all frequency components therein are deemed to be zero, whereby the number of bits may be diminished without deteriorating the signal quality for ensuring high efficiency encoding.

In addition, by providing means for determining the encoding unit configuration, and by encoding the input data using the zero encoding unit specifying information only when the particular encoding unit is selected, the waveform signal can be efficiently encoded in accordance with the energy distribution of the spectral signals. If the present encoding method and apparatus are applied to encoding the acoustic signals, the tonal components, which are crucial to the hearing sense, may be encoded with high fidelity without lowering the encoding efficiency in case the signal spectrum has a flatter energy distribution, thereby ensuring high efficiency signal compression.

For the zero unit specifying information, the flag information associated with the respective encoding units or the run-length information furnishing the position information of the zero en coding units may be employed. If there exist a large number of the zero encoding units, the encoding efficiency may be improved further by employing the run-length information.

With the information recording medium according to the present invention, since the information specifying the zero encoding unit in which all of the frequency components in an encoding unit are deemed to be zero and the signal components are encoded and recorded thereon, that is, data encoded with high efficiency with a smaller number of bits, are recorded thereon, the recording capacity of the recording medium can be increased effectively.

DESCRIPTION OF THE PREFERRED EMBODIMENTS

Figure 1:
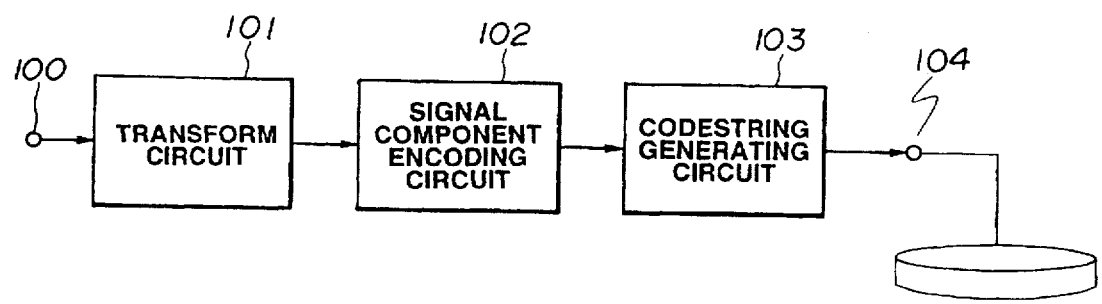
FIG. 1 is a block diagram showing an encoding apparatus embodying the present invention.

Referring to the drawings, preferred embodiments of the present invention will be explained in detail.

In FIG. 1, there is shown, in a block diagram, a schematic arrangement of an information encoding method according to the present invention.

Referring to FIG. 1, an acoustic signal waveform, supplied at a terminal 100, is transformed by a transform circuit 101 into signal frequency components which are then encoded by a signal component encoding circuit 102. The encoded signal frequency components are converted by a codestring generating circuit 103 into a codestring which is outputted at a terminal 104, and, e.g., recorded on a recording medium 105.

Figure 2:
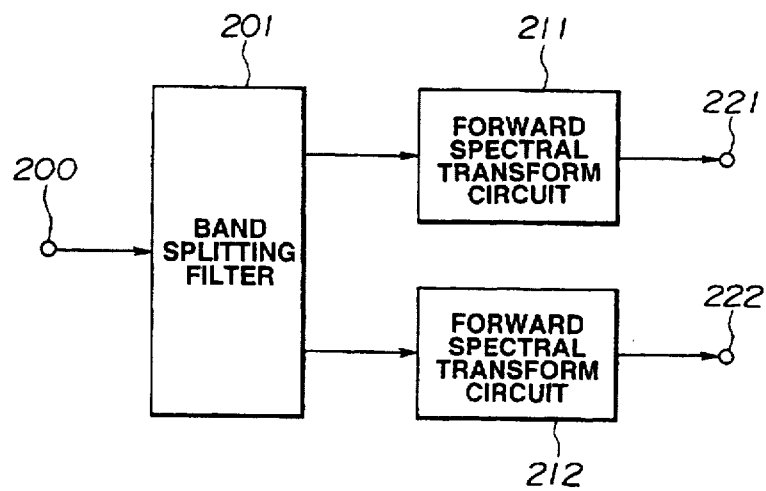
FIG. 2 is a block diagram showing a typical transform circuit of the encoding apparatus shown in FIG. 1.

In FIG. 2, there is shown, in a block diagram, an illustrative arrangement of the transform circuit 101 shown in FIG. 1.

In FIG. 2, the signal supplied via a terminal 200, that is a signal obtained via the terminal 100 of FIG. 1, is split by a band splitting filter 201 into two frequency bands. The signal split by the band splitting filter 201 into two frequency bands is converted into spectral signal components by forward orthogonal transform circuits 211, 212 responsible for effecting orthogonal transform, such as MDCT. Outputs of these forward orthogonal transform circuits 211, 212 are taken out via terminals 221, 222 so as to be transmitted to the signal component encoding circuit 102 of FIG. 1.

The bandwidth of the signals from the forward orthogonal transform circuits 211, 212 is one-half the bandwidth of the signal entering the terminal 200, so that the signal from the terminal 200 is decimated by one-half. A variety of transform means other than those shown in the present embodiment, such as directly transforming the input signals into spectral signals, may be employed. DFT or DCT may also be employed in place of MDCT. Although the signals may be split by a so-called band-splitting filter into respective band components, it is convenient to use the method of transforming the input signals into frequency components by the above-mentioned orthogonal transform in which a large number of frequency components are obtained by a relatively small quantity of arithmetic-logical operations. The reason is that the inventive method is most effective in cases wherein the energy is concentrated in specified frequencies.

Figure 3:
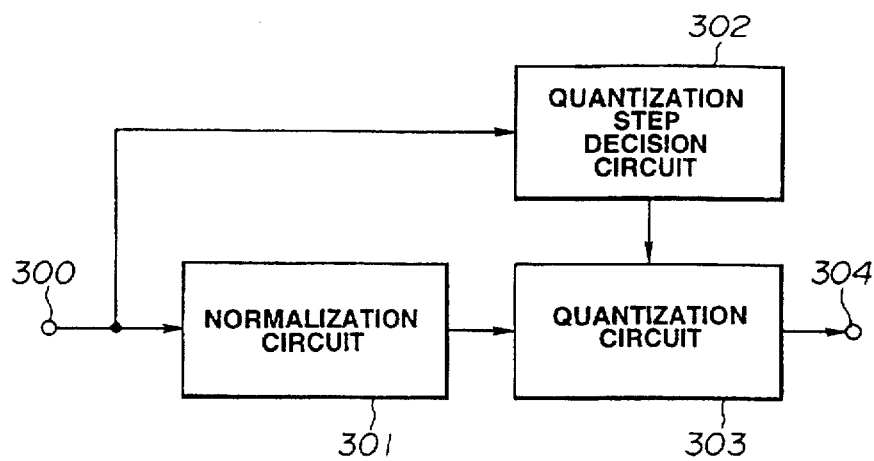
FIG. 3 is a block diagram showing a typical signal component encoding circuit of the encoding apparatus shown in FIG. 1.

In FIG. 3, there is shown, in a block diagram, a typical illustrative construction of the signal component encoding circuit 102 of FIG. 1.

Referring to FIG. 3, an output of the transform circuit 101, supplied to a terminal 300, is normalized by a normalization circuit 301 from one pre-set band to another. The normalized signal is then sent to a quantization circuit 303. The signal supplied to the terminal 300 is also sent to a quantization step decision circuit 302.

The quantization circuit 303 quantizes the signal from the normalization circuit 301 based upon the quantization step information calculated from the signal entering the terminal 300 by the quantization step decision circuit 302. An output of the quantization circuit 303 is sent from a terminal 304 so as to be sent to the codestring generating circuit 103 shown in FIG. 1. In addition to the signal component quantized by the quantization circuit 303, the normalization coefficient information in the normalization circuit 301 and the quantization step information in the quantization step decision circuit 302 are contained in the output signal at the output terminal 304.

Figure 4:
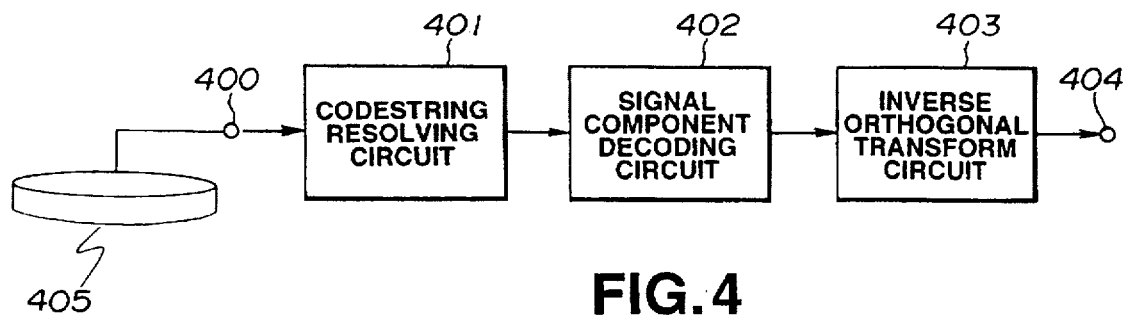
FIG. 4 is a block diagram showing a decoding apparatus embodying the present invention.

In FIG. 4, there is shown, in a schematic block diagram, the constitution of an information decoding apparatus for decoding the acoustic signal from the codestring generated by the information encoding apparatus shown in FIG. 1 and outputting the decoded acoustic signal.

Referring to FIG. 4, the codes of respective signal components read from a recording medium 405; are extracted by a codestring resolving circuit 401 from the codestring generated by the information encoding apparatus having the constitution of FIG. 1 and supplied via a terminal 400. From these codes, the respective signal components are restored by a signal component decoding circuit 402 and subsequently inverse orthogonal transformed by an inverse orthogonal transform circuit 403 in a manner associated with the transform operation performed by the transform circuit 101 shown in FIG. 1. This generates acoustic waveform signals which are outputted at an output terminal 404.

Figure 5:
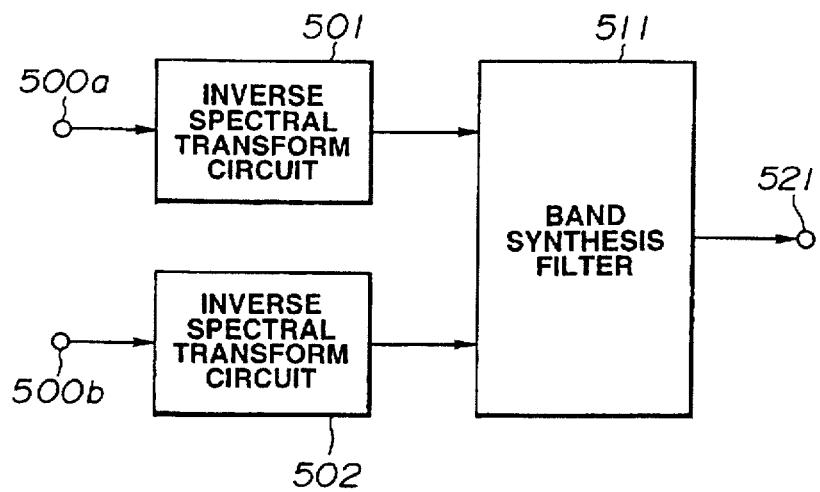
FIG. 5 is a block diagram showing a typical inverse orthogonal transform circuit of the decoding apparatus shown in FIG. 4.

In FIG. 5, there is shown, in a block diagram, an illustrative construction of the inverse transform circuit 403 shown in FIG. 4.

The construction shown in FIG. 5 is associated with that of the transform circuit 101 shown in FIG. 2. Thus the signal supplied via terminals 500a, 500b from the signal component decoding circuit 402 of FIG. 4 is transformed by inverse orthogonal transform circuits 501, 502 configured for executing inverse orthogonal transform associated with the forward orthogonal transform shown in FIG. 2. The signals of the respective bands obtained by the inverse orthogonal transform circuits 501, 502 are synthesized by a band synthesis filter 511. An output of the band synthesis filter 511 is taken out at a terminal 521, that is at a terminal 404 of FIG. 4.

Figure 6:
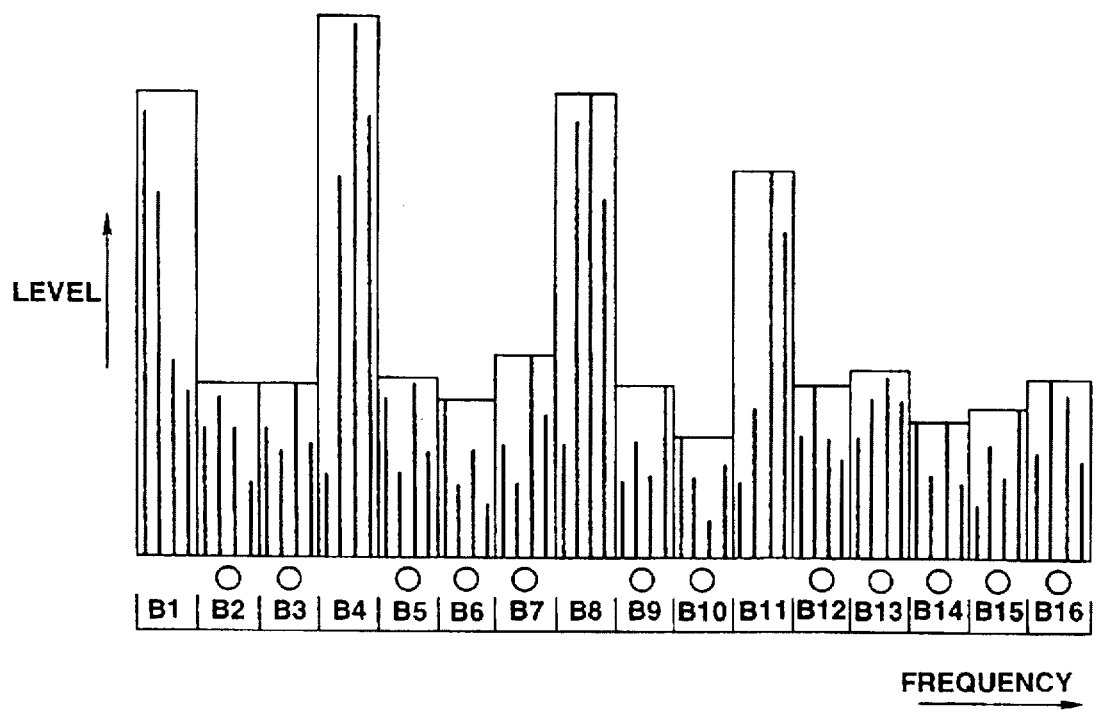
FIG. 6 illustrates an typical spectral signals for illustrating the encoding method embodying the present invention.

FIG. 6 illustrates a conventional encoding method carried out by the information encoding apparatus shown in FIG. 1. In the example shown in FIG. 6, the spectral signals have been produced by the transform circuit 101 shown in FIG. 1, that is the circuit having a construction as shown in FIG. 2. In FIG. 6, the levels of the absolute values of the spectral signals by MDCT are transformed into and shown as dB values.

Referring to FIG. 6, input signals have been transformed into, for example, 64 spectral signals for each of pre-set time blocks. These 64 spectral signals are grouped into 16 pre-set bands B1 to B16 shown in FIG. 6. These groups are each referred to herein as an encoding unit. The encoding units, indicated by O marks, are the aforementioned zero encoding units. For encoding, the spectral coefficients included in these encoding units are regarded as being all zero. For the remaining encoding units, the spectral coefficients are quantized with the numbers of bits as found by the quantization step decision circuit 302 shown in FIG. 3. It is assumed that zero bit is accorded to the zero encoding unit.

Figure 7:
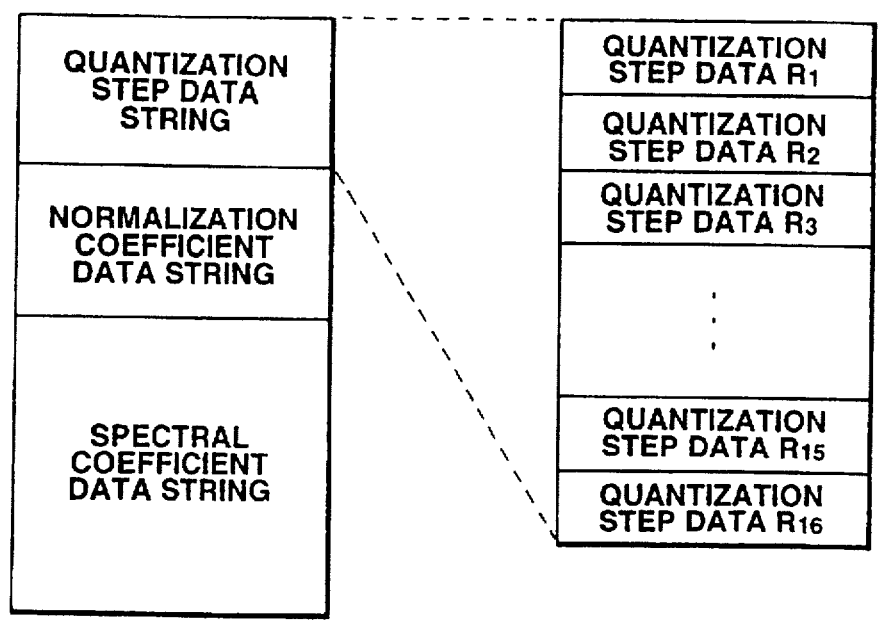
FIG. 7 illustrates a typical codestring obtained on encoding according to a conventional encoding method.

FIG. 7 shows a prior-art example of a codestring encoded in this manner. In this figure, the codes for one transform block are shown. In the present example, the quantization step data $R_1$ to $R_{16}$ for the encoding units B1 to B16 in each transform block are encoded. These quantization step data $R_1$ to $R_{16}$, that is the numbers of the quantization bits, are encoded with the pre-set numbers of bits in order to constitute a quantization step data string.

If quantization is carried out in each of the encoding units with any one of the numbers of bits of from 0 to 15, the quantization step data $R_1$ to $R_{16}$ can be encoded with four bits. Next to the quantization step data are encoded the normalization coefficient data, followed by a spectral coefficient data string formed by normalizing and quantizing the respective spectral coefficients from one encoding unit to another. As for the normalization coefficient data for the zero encoding units, these may be omitted or may be given dummy codes.

However, with the prior-art example shown in FIG. 7, it is necessary to encode the quantization step data of the respective encoding units with a pre-set number of bits, herein four bits. This is not meritorious in efficiency if there are a large number of the zero encoding units. In particular, if the input signal is a tonal signal in which the signal energy is concentrated in a few spectral components, as shown in FIG. 6, the signal components of the encoding units with the low energy levels are masked by the low-range signals, so that deterioration in the sound quality is scarcely produced if these signal components are handled as zero encoding units. Thus the method shown in FIG. 7 suffers from waste in encoding.

In the above-described embodiment, normalization and quantization are carried out in the respective encoding units. However, the present invention may also be applied to a case in which normalization is not carried out using the normalization coefficients set for the respective encoding units. Of course, more efficient encoding may be achieved by carrying out normalization at the time of quantization.

Figure 8:
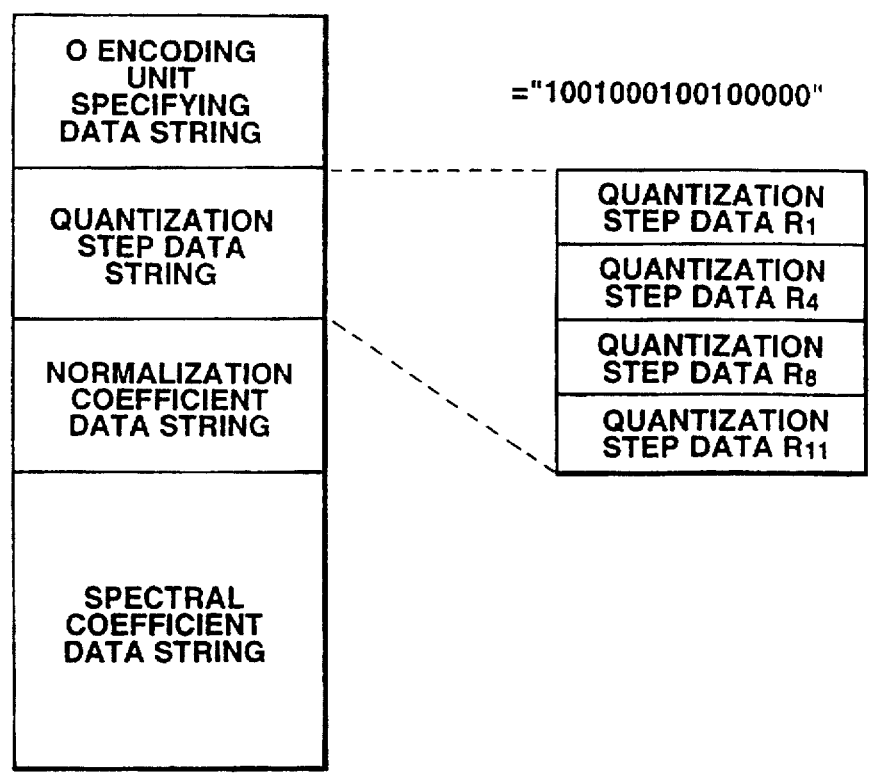
FIG. 8 illustrates a typical codestring obtained on encoding according to the encoding method of the present invention.

In FIG. 8, there is shown an illustrative example of a code obtained in an embodiment of the encoding method of the present invention which is proposed with the above in mind.

In the example of FIG. 8, a zero encoding unit specifying data string has been encoded ahead of the quantization step data string. The zero encoding unit specifying data string in the present embodiment is a string of 1-bit flags which assume a value of "0" if the encoding unit is a zero encoding unit and which assumes the value of "1" if the encoding unit is not the zero encoding unit. The zero encoding unit specifying data string for the illustrative example of FIG. 6 becomes "1001000100100000". The actual quantization step data encoded is the data associated with the encoding units other than the zero encoding units. That is, in the above illustrative example, only the quantization step data $R_1$, $R_4$, $R_8$, $R_{11}$ for the encoding units B1, B4, B8 and B11 are encoded. If there are many zero encoding units, the quantization step data therefor can be omitted for realizing efficient encoding.

Figure 9:
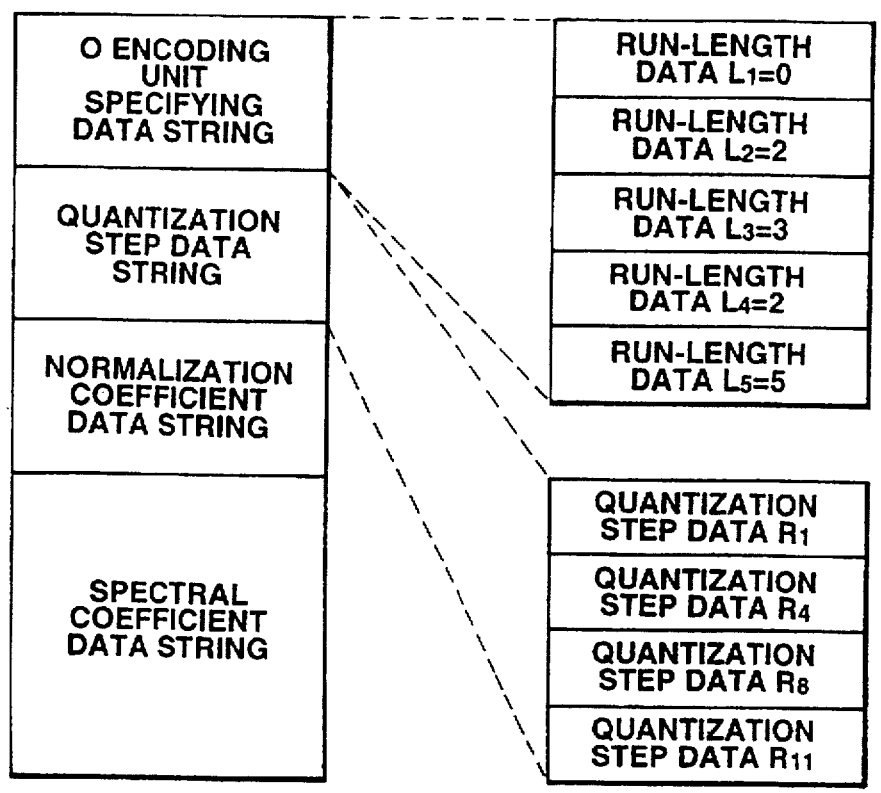
FIG. 9 illustrates another typical codestring obtained on encoding according to the encoding method of the present invention.

In FIG. 9, there is shown an illustrative example of codes obtained with a modification of the present invention.

In the example shown in FIG. 9, as in the previous example, the zero encoding unit specifying data string is encoded prior to encoding the quantization step data string. However, with the example of FIG. 9, the zero encoding unit specifying data string is not the flag information, but is the run-length information specifying the position of the zero encoding unit. That is, in the present example, since the first encoding unit B1 as counted from the low range side is not the zero encoding unit, the value of the run-length information $L_1$ of 0 is encoded. On the other hand, the next non-zero encoding unit as counted from the lowrange side is B4 and there exist two encoding units between B4 and B1, the value of the run-length information $L_2$ of 2 is encoded. The run-length information data $L_3$ to $L_5$ are encoded in a similar manner. In the present example, if there are a large number of zero encoding units, the quantization step data there for can similarly be omitted thus enabling efficient encoding.

Figure 10:
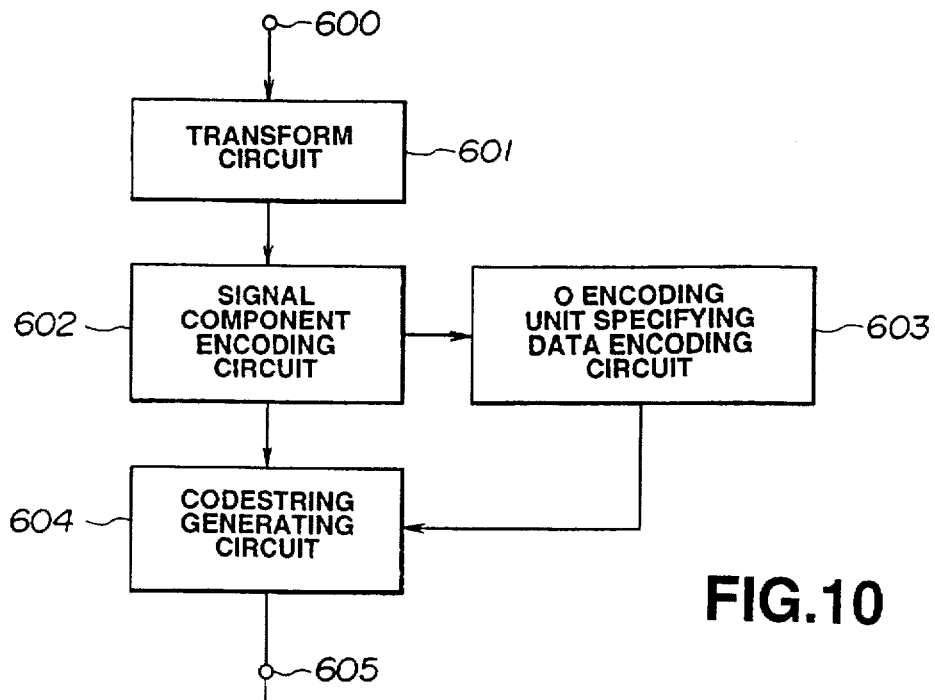
FIG. 10 is a block diagram showing a typical encoding apparatus embodying the present invention.

In FIG. 10, there is shown a schematic arrangement of an encoding apparatus (encoder) for encoding acoustic waveform signals as an embodiment of an information encoding apparatus according to the present invention.

Referring to FIG. 10, the waveform signal entering an input terminal 600 is transformed by a transform circuit 601 into spectral signals. Signal components of the spectral signals, that is spectral coefficients, are normalized and quantized by a signal component encoding circuit 602 from one encoding unit to another. Based upon the results of outputs of the signal component encoding circuit 602, a zero encoding unit specifying data encoding circuit 603 generates the encoding unit specifying data string shown in FIGS. 8 or 9. The codestring generating circuit 604 collects the results of outputs of the signal component encoding circuit 602 and the zero encoding unit specifying data encoding circuit 603 together and converts the results into a codestring from one transform block to another in order to output the resulting codestring at an output terminal 605 and, e.g., recorded on a recording medium 606.

Figure 11:
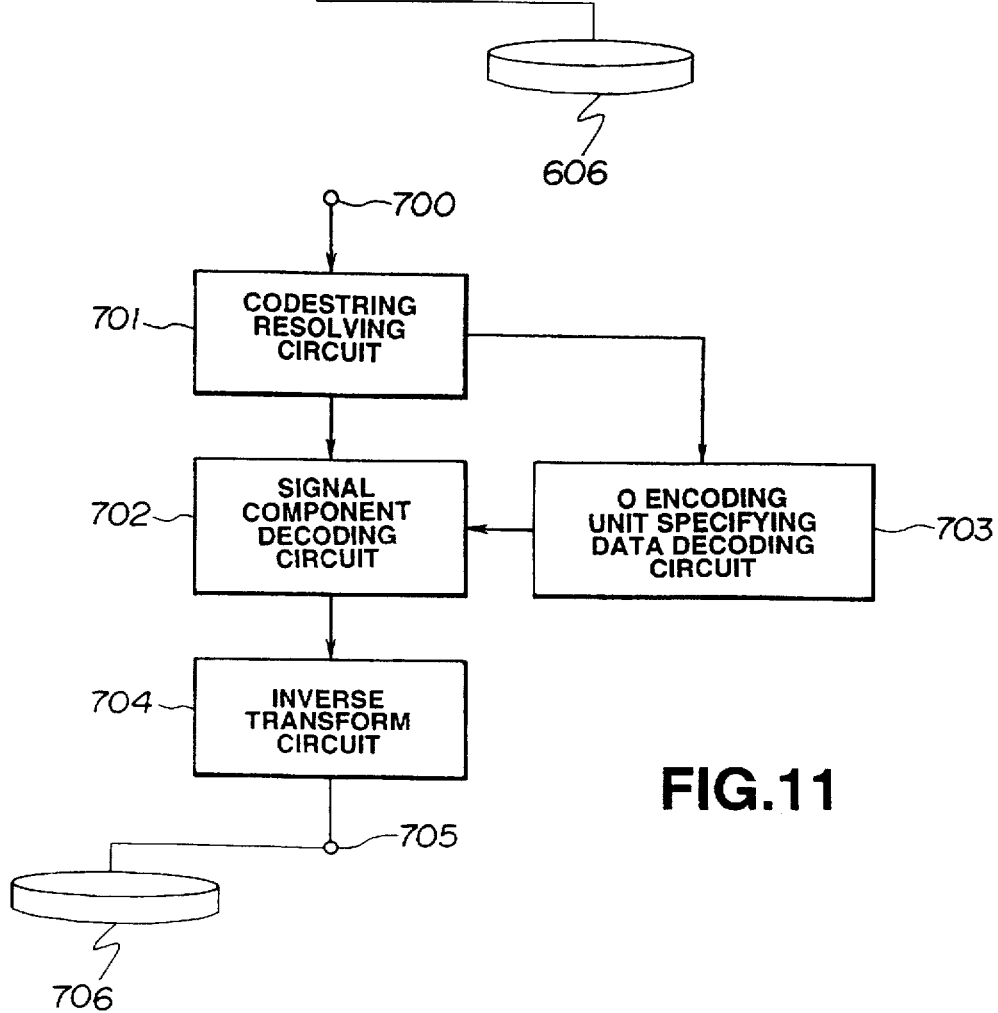
FIG. 11 is a block diagram showing a typical decoding apparatus embodying the present invention.

In FIG. 11, there is shown a typical arrangement of a decoding apparatus (decoder) which is a counterpart device of the encoder shown in FIG. 10. The decoder outputs acoustic signals from the codestring generated by the encoder shown in FIG. 10.

A codestring resolving circuit 701 receives the codestring (e.g., from a recording medium 706) separates the zero encoding unit specifying data strings from the codestrings entering a terminal 700 and transmits the separated zero encoding unit specifying data strings to a zero encoding unit specifying data decoding circuit 703. The zero encoding unit specifying data decoding circuit 703 discerns, from the zero encoding unit specifying data strings, which encoding units are zero encoding units, and transmits the results to a signal component decoding circuit 702. The signal component decoding circuit 702 decodes, based upon the results of decision sent from the zero encoding unit specifying data decoding circuit 703, the quantization step data string, normalization coefficient data string and the spectral coefficient data string, transmitted from the codestring resolving circuit 701, and transmits the resulting frequency component data to an inverse orthogonal transform circuit 704. The inverse orthogonal transform circuit 704 inverse orthogonal transforms the frequency component data and outputs the resulting data at an output terminal 705.

Thus it is possible with the method of the present invention to diminish the number of bits required for encoding the quantization step information effectively. This method is particularly effective if the tonal signal waveform having the signal energy concentrated in a few discretely distributed spectral coefficients is to be taken out and encoded separately from the non-tonal components because the encoding units with low energy may be handled in such case as zero encoding units without deteriorating the sound quality significantly.

Meanwhile, the embodiments of the present invention may be applied to the information encoding and decoding techniques as proposed by the present Assignee in Jp patent Application Jp-A-6-130654.

The above technique proposed in the above-mentioned JP patent Application No.6-130654 includes means for transforming an input signal into frequency components, means for encoding an output of the transform means by normalization and quantization from one encoding unit to another, and an encoding unit configuration decision means. With this prior-art technique, there are plural methods of resolving the frequency components to respective encoding units even although the frequency resolution remains the same. In other words, the high encoding efficiency is realized by varying the quantization bandwidth of the frequency components depending on the manner of spectral distribution of the input signal. For transforming the input signal into frequency components by transform means and encoding an output of the transform means by normalization and quantization from one encoding unit to another, there is provided an encoding unit configuration decision step. In this encoding unit configuration decision step, plural methods are provided for resolving the frequency components into respective encoding units even although the frequency resolution is the same.

In the information encoding technique, plural frequency components associated with different frequencies are contained in one encoding unit. Plural encoding unit constituting modes are set from one pre-set band to another. On the other hand, plural encoding unit constituting modes are set for the entire range of the frequency spectrum. If the energy distribution of the spectrum in the frequency domain is relatively flat, the frequency components may be resolved every few encoding units of broader bandwidths. An example of the encoding unit configuration mode is changing the bandwidth of the encoding unit depending upon the energy distribution of the spectrum of the input signals. Specifically, the encoding unit is of a broader or narrower bandwidth if the energy distribution of the spectrum of the signals to be encoded is flatter or concentrated in a few spectral coefficients, respectively.

These features hold for the technique of information decoding.

The methods of the above-described embodiments of the present invention may be applied to these information encoding or decoding techniques. More specifically, the embodiments of the present invention may be adaptively applied depending on signal characteristics in the respective transform blocks.

Figure 12:
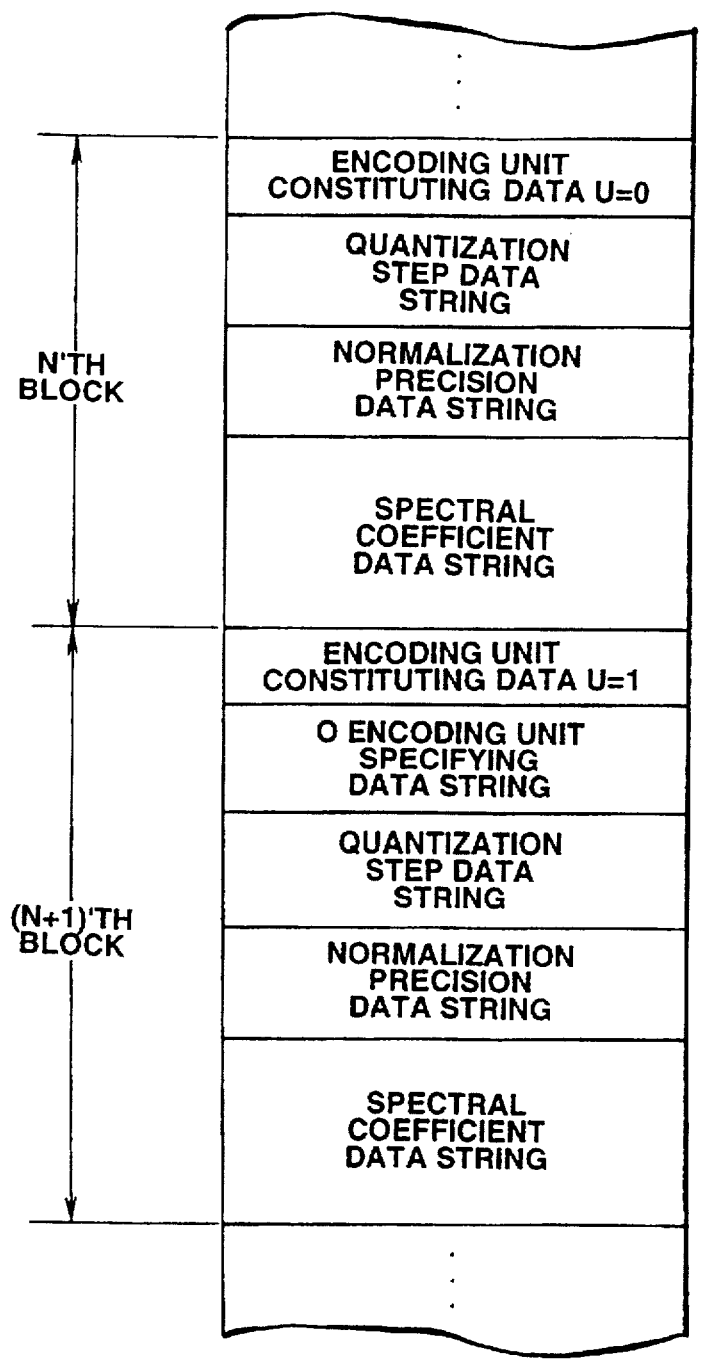
FIG. 12 illustrates a typical codestring obtained on adaptive block-based encoding according to the encoding method of the present invention.

FIG. 12 shows an illustrative example of the block-based adaptive application of the methods of the present invention.

In the example of FIG. 12, since the input signal in the N'th block is not tonal, the frequency components are resolved into a fewer number of encoding units. This is indicated by a encoding unit constituting data U assuming the value of zero. In such case, the block is encoded in the conventional encoding method explained in connection with FIG. 7, while the zero encoding unit specifying information is not encoded. On the other hand, since the input signal in the (N+1)st block is tonal, the frequency components are resolved into a larger number of encoding units. This is indicated by the encoding unit constituting data U assuming the value of "1". In this block, the encoding is carried out in accordance with the method of the present invention shown in FIGS. 8 or 9 by encoding the zero encoding unit specifying information.

Figure 13:
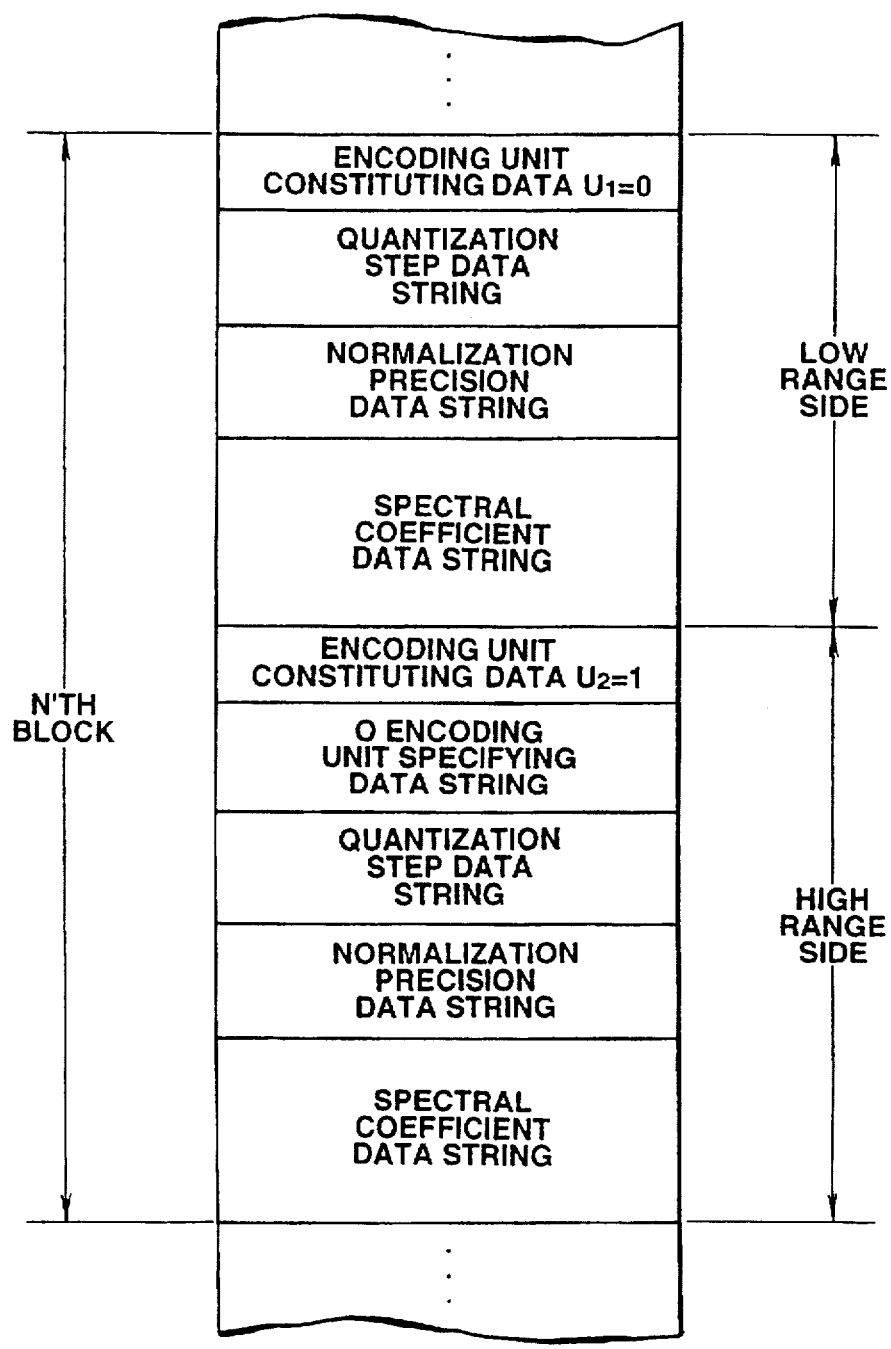
FIG. 13 illustrates a typical codestring obtained on adaptive band-based encoding according to the encoding method of the present invention.

The method of the present invention may also be applied in accordance with signal characteristics on the band basis. FIG. 13 shows an embodiment of the present invention in which the encoding is applied on the band basis.

In the embodiment shown in FIG. 13, since the low-range side of an input signal of the N'th block is not tonal, the frequency components are resolved into a fewer number of encoding units. This is indicated by an encoding unit constituting data $U_1$ assuming the value of zero. In such case, the encoding is carried out in accordance with the conventional method shown in FIG. 7, while the zero encoding unit specifying information is not encoded. On the other hand, since the high-range side of the input signal is tonal, the frequency components are resolved into a larger number of encoding units. This is indicated by an encoding unit constituting data $U_2$ assuming the value of "1". In this block, the encoding is carried out in accordance with the method of the present invention shown in FIGS. 8 or 9 by encoding the zero encoding unit specifying information.

Figure 14:
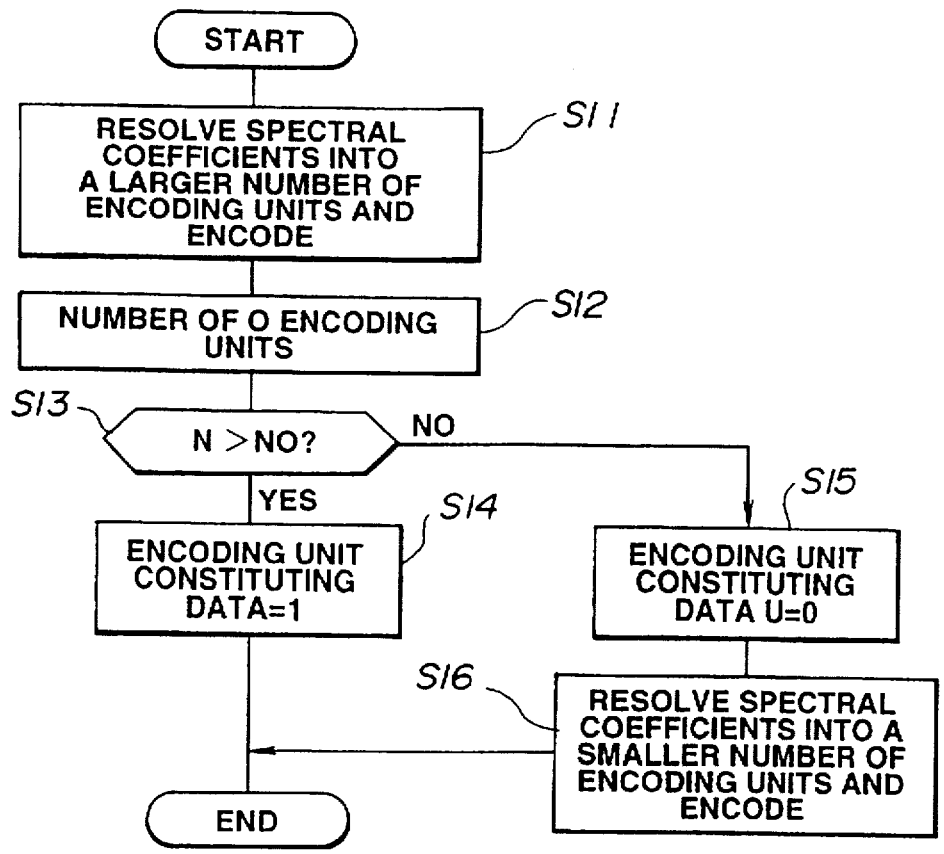
FIG. 14 is a flow chart for illustrating the encoding method embodying the present invention.

FIG. 14 shows, by a flow chart, an example of processing in an encoding apparatus in case the encoding employing the encoding unit specifying information is adaptively applied on the block or band basis as described above.

In the processing example of FIG. 14, spectral components are resolved at step S11 into a larger number of encoding units in order to carry out encoding. At the next step S12, the number of the zero encoding units is set to N. At the next step S13, it is judged whether or not the number of zero encoding units exceeds a pre-set value N0. If the result is YES, that is if the number N of the zero encoding units exceeds the pre-set value N0, the signal is regarded as being a tonal signal having the energy distribution concentrated in pre-set frequency components. Thus the processing transfers to step S14 where the encoding unit constituting information U is set to 1 (U=1). The frequency components are then resolved into a larger number of encoding units in order to carry out encoding.

On the other hand, if the result of decision at step S13 is NO, that is if the number N of the zero encoding units does not exceed the pre-set value N0, the processing transfers to step S15 where the encoding unit constituting information U is set to zero (U=0). At the next step S16, the spectral components are re-resolved into a fewer number of encoding units in order to carry out encoding. Thus the encoding is carried out using the zero encoding unit specifying information only when the encoding unit constituting information U is set to 1 (U=1).

Figure 15:
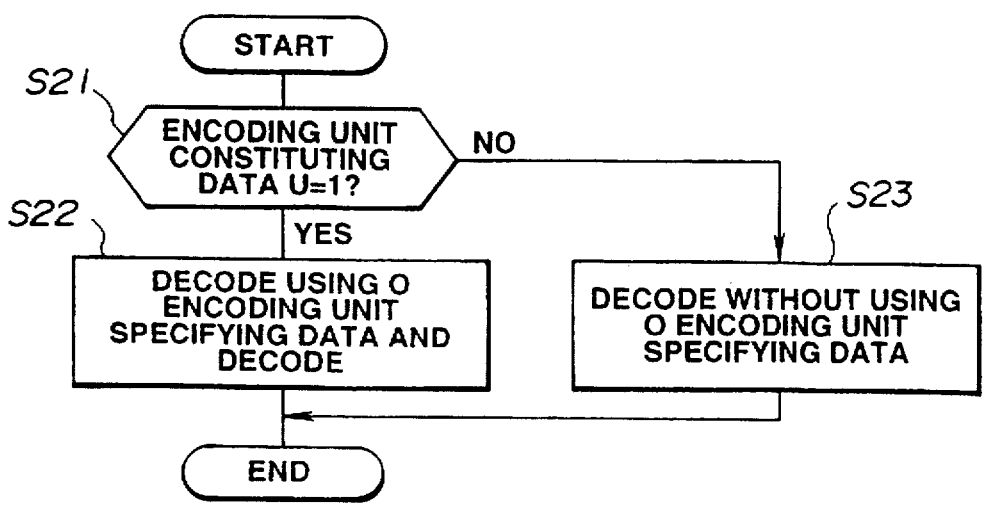
FIG. 15 is a flow chart for illustrating the decoding method embodying the present invention.

FIG. 15 shows, in a flow chart, an example of processing by decoding means when the codes employing the encoding unit specifying information are adaptively decoded on the block or band basis as described above.

In the processing example shown in FIG. 15, it is judged at step S21 whether or not the value of the encoding unit constituting information U is equal to 1. If the result is YES, that is if the value of the encoding unit constituting information U is 1, the processing transfers to step S22 where decoding is carried out on the assumption that the frequency components have been resolved into a larger number of encoding units and encoding has been carried out using the zero encoding unit specifying information. If the result is NO, that is if the encoding unit constituting information U is zero, the processing transfers to step S23 where decoding is carried out on the assumption that the frequency components have been resolved into a fewer number of encoding units and encoding has been carried out without using the zero encoding unit specifying information.

Although the foregoing description has been made in connection with the case of conversion of the waveform signals into spectral signals by a band splitting filter and orthogonal transform, the method of the present invention may naturally be applied to the case of transforming the waveform signals into spectral signals solely by orthogonal transform without employing a band splitting filter. The method of the present invention may also be applied to the case of constituting the encoding units for each band split by the band-splitting filter without employing orthogonal transform such as DFT, DCT or MDCT. In addition, the present invention may also be applied to a method for transmitting information signals.

Although the above description of the embodiments of the present invention is centered about application of the technique of the present invention to acoustic signals, the technique of the present invention may also be applied to encoding and decoding of waveform signals in general. However, the present invention can be applied with utmost effects to acoustic signals because the tonal signals, required to be of high fidelity in view of the human hearing sense, may then be encoded efficiently.

What I claimed is:

1. An information encoding method comprising the steps of:

transforming an input signal into frequency components by transform means;

encoding an output of said transform means by quantization from one encoding unit to another; and encoding a specifying information specifying a zero encoding unit in which all frequency components are deemed to be zero;

wherein quantization step information for the zero encoding unit is not encoded, the information encoding method further comprising a step of determining a configuration of the encoding unit, wherein the encoding employing the zero encoding unit specifying information is carried out using the zero encoding unit specifying information only when a specified encoding unit configuration is selected.

2. The information encoding method as claimed in claim 1, wherein the zero encoding unit specifying information is flag data associated with each encoding unit.

3. The information encoding method as claimed in claim 1, wherein the zero encoding unit specifying information is run-length data furnishing the position information of the zero encoding unit.

4. The information encoding method as claimed in claim 1, wherein the encoding unit configuration is selectable on a block basis.

5. The information encoding method as claimed in claim 1, wherein the encoding unit configuration is selectable on a band basis.

6. The information encoding method as claimed in claim 1, wherein the input signal is an acoustic signal.

7. An information decoding method for decoding a signal encoded by a pre-set encoding method from one encoding unit to another, comprising the steps of:

decoding signal components of the encoded signal;

inverse orthogonal transforming the decoded signal components into time domain signals and decoding information specifying an encoding unit in which all of frequency components thereof are set to zero;

wherein the step of decoding the signal components decodes the signal components based upon an output of the step of decoding the zero encoding unit specifying information the information decoding method further comprising the step of decoding the encoding unit configuration, wherein decoding is done using the zero encoding unit specifying information only when a specified encoding unit configuration is decoded in accordance with the encoding unit configuration.

8. The information decoding method as claimed in claim 7, wherein the zero encoding unit specifying information is flag data associated with each encoding unit.

9. The information decoding method as claimed in claim 7, wherein the zero encoding unit specifying information is runlength data associated with each encoding unit.

10. The information decoding method as claimed in claim 7, wherein the encoding unit configuration is selectable on a block basis.

11. The information decoding method as claimed in claim 7, wherein the encoding unit configuration is selectable on a band basis.

12. The information decoding method as claimed in claim 7, wherein the output signal represents an acoustic signal.

13. An information recording medium having recorded thereon an encoded signal that includes information specifying zero encoding units in which all frequency components in an encoding unit as an encoding unit are deemed to be zero, and signal component information, wherein the zero encoding unit specifying information is arrayed upstream of the signal component information to constitute a data stream wherein the zero encoding unit specifying information is also encoded only when encoding unit configuration information having a particular value is encoded.

14. The information recording medium as claimed in claim 13, wherein the zero encoding unit specifying information is flag data.

15. The information encoding method as claimed in claim 13, wherein the zero encoding unit specifying information is run-length data.

16. The information recording medium as claimed in claim 13, wherein the encoding unit constituting information is encoded on a block basis.

17. The information recording medium as claimed in claim 16, wherein the encoding unit configuration information is encoded on a band basis.

18. The information recording medium as claimed in claim 13, wherein the encoded signal is an acoustic signal.

* * * * *